United States Patent
Liebler et al.

(10) Patent No.: US 9,793,012 B2
(45) Date of Patent: Oct. 17, 2017

(54) NUCLEAR FUEL ASSEMBLY SPACER GRID AND CORRESPONDING NUCLEAR FUEL ASSEMBLY

(75) Inventors: Michael Liebler, Heilsbronn (DE); Dirk Blavius, Erlangen (DE)

(73) Assignee: AREVA NP, Courbevoie (FR)

( * ) Notice: Subject to any disclaimer, the term of this patent is extended or adjusted under 35 U.S.C. 154(b) by 1127 days.

(21) Appl. No.: 13/822,565

(22) PCT Filed: May 14, 2012

(86) PCT No.: PCT/EP2012/058911
§ 371 (c)(1),
(2), (4) Date: Jun. 7, 2013

(87) PCT Pub. No.: WO2012/159916
PCT Pub. Date: Nov. 29, 2012

(65) Prior Publication Data
US 2013/0251089 A1    Sep. 26, 2013

(30) Foreign Application Priority Data
May 20, 2011   (EP) .................................... 11305626

(51) Int. Cl.
*G21C 3/356*   (2006.01)
*G21C 3/352*   (2006.01)

(52) U.S. Cl.
CPC ........... *G21C 3/356* (2013.01); *G21C 3/3563* (2013.01); *G21C 3/352* (2013.01); *Y02E 30/40* (2013.01)

(58) Field of Classification Search
CPC ....... G21C 3/356; G21C 3/3563; G21C 3/352

USPC .................................................. 376/442, 448
See application file for complete search history.

(56) References Cited

U.S. PATENT DOCUMENTS

| | | | | |
|---|---|---|---|---|
| 4,058,436 A | * | 11/1977 | Anthony | G21C 3/3563 376/442 |
| 4,957,697 A | | 9/1990 | Wada | |
| 5,080,858 A | * | 1/1992 | Nylund | G21C 3/322 376/439 |
| 5,139,736 A | * | 8/1992 | Bryan | G21C 3/3563 376/438 |
| 5,253,278 A | * | 10/1993 | Kanazawa | G21C 3/324 376/448 |

(Continued)

FOREIGN PATENT DOCUMENTS

| | | |
|---|---|---|
| CN | 101297374 A | 10/2008 |
| CN | 101903957 A | 12/2010 |

(Continued)

OTHER PUBLICATIONS

International Search Report for corresponding International Application PCT/EP2012/058911.

*Primary Examiner* — Jack W Keith
*Assistant Examiner* — Daniel Wasil
(74) *Attorney, Agent, or Firm* — Davidson, Davidson & Kappel, LLC

(57) ABSTRACT

A nuclear fuel assembly spacer grid defining a lattice of cells for receiving fuel rods is provided. The spacer grid includes a peripheral band composed of at least one peripheral strip delimiting a portion of the peripheral contour of the spacer grid, and at least one spacer grid positioning spring elastically deformable and formed in the peripheral band.

15 Claims, 5 Drawing Sheets

(56) References Cited

U.S. PATENT DOCUMENTS

| | | | | |
|---|---|---|---|---|
| 5,267,291 | A * | 11/1993 | Matzner | G21C 3/33 |
| | | | | 376/442 |
| 5,307,392 | A * | 4/1994 | Bryan | G21C 3/34 |
| | | | | 376/448 |
| 5,530,729 | A * | 6/1996 | Gustafsson | G21C 3/322 |
| | | | | 376/438 |
| 7,421,056 | B2 * | 9/2008 | Liebler-Ranzus | G21C 3/352 |
| | | | | 376/442 |
| 2005/0105676 | A1 | 5/2005 | Liebler-Ranzus | |
| 2005/0243961 | A1 | 11/2005 | Bucheit et al. | |
| 2007/0076840 | A1 | 4/2007 | Beati et al. | |
| 2008/0267340 | A1 * | 10/2008 | Higgins | G21C 3/352 |
| | | | | 376/438 |
| 2009/0180582 | A1 * | 7/2009 | Liebler-Ranzus | G21C 3/352 |
| | | | | 376/448 |
| 2010/0246747 | A1 | 9/2010 | Gomez et al. | |

FOREIGN PATENT DOCUMENTS

| | | |
|---|---|---|
| EP | 0557085 A1 | 8/1993 |
| JP | S5510541 A | 1/1980 |
| JP | S5527940 A | 2/1980 |
| JP | S56133680 A | 10/1981 |
| JP | H01173898 A | 7/1989 |
| JP | H02257092 A | 10/1990 |
| JP | 5 323073 A | 12/1993 |
| JP | H05341074 A | 12/1993 |
| JP | 2008275615 A | 11/2008 |
| WO | WO 03/077261 A2 | 9/2003 |

* cited by examiner

NUCLEAR FUEL ASSEMBLY SPACER GRID AND CORRESPONDING NUCLEAR FUEL ASSEMBLY

The present invention relates to a nuclear fuel assembly spacer grid defining a lattice of cells for receiving fuel rods.

BACKGROUND

A boiling water reactor nuclear fuel assembly (or "BWR fuel assembly") generally comprises a bundle of fuel rods maintained laterally by spacer grids distributed along the bundle of fuel rods, at least one tubular water channel provided within the bundle of fuel rods for channeling a flow of coolant/moderator separately from the fuel rods and a tubular fuel channel encasing the bundle of fuel rods for channeling a flow of coolant/moderator between and about the fuel rods. Similarly, a water-water energetic reactor nuclear fuel assembly (or "VVER fuel assembly") generally comprises a bundle of fuel rods maintained laterally by spacer grids distributed along the bundle of fuel rods, at least one water rod provided within the bundle of fuel rods for channeling a flow of coolant/moderator separately from the fuel rods and a tubular fuel channel encasing the bundle of fuel rods for channeling a flow of coolant/moderator between and about the fuel rods.

A spacer grid generally defines a lattice of cells for receiving fuel rods and comprises a peripheral band composed of peripheral strips and delimiting the peripheral contour of the spacer grid. It preferably comprises positioning means provided on the peripheral band for ensuring an adequate lateral positioning of the spacer grid inside the fuel channel for ensuring an adequate flow of coolant/moderator between and about the fuel rods, namely about the peripheral fuel rods located adjacent to the inner walls of the fuel channel.

US 2005/0246961, EP 0 709 0857 and U.S. Pat. No. 6,156,043 disclose spacer grids comprising a peripheral band provided with rigid tabs, lobs or stops protruding outwardly from the outer periphery of the peripheral band and formed in the peripheral band and/or assembled to the peripheral band.

SUMMARY OF THE INVENTION

An object of the invention is to provide a nuclear fuel assembly spacer grid allowing good lateral positioning of the bundle of fuel rods within the fuel channel, while being obtainable easily and at low cost.

To this end, a nuclear fuel assembly spacer grid defining a lattice of cells for receiving fuel rods is provided, wherein the spacer grid comprises a peripheral band composed of at least one peripheral strip delimiting a portion of the peripheral contour of the spacer grid, and at least one spacer grid positioning spring elastically deformable and formed in the peripheral band.

In other embodiments, the spacer grid comprises one or several of the following features, taken in isolation or in any technically feasible combination:

- the at least one spring is cantilevered;
- the at least one spring is stamped in the peripheral band;
- the at least one spring is delimited in the peripheral band by at least one elongated slot cut in the peripheral band;
- the at least one elongated slot is a curved slot;
- the at least one spring comprises a flexible cantilevered tab and a rigid contact projection protruding outwardly from the tab;
- the at least one spring is adjacent to a longitudinal end of one of the at least one peripheral strip;
- two springs are formed in one of the at least one peripheral strip each adjacent to a respective longitudinal end of the peripheral strip;
- the peripheral band is composed of several peripheral strips each delimiting a side of the peripheral contour of the spacer grid and each comprising two springs each adjacent to a respective longitudinal end of the corresponding peripheral strip;
- one spring is formed by one free cantilevered end portion of the peripheral band;
- one corner cell is delimited by two peripheral strip free end portions of two peripheral strips of the peripheral band delimiting two adjacent sides of the peripheral contour of the spacer grid, said free end portions being separated from each other by an aperture such that the or each cell corner is laterally opened;
- each corner cell is delimited by two free end portions of two adjacent peripheral strips separated by an aperture;
- each free end portion delimiting a laterally opened corner cell forms a spacer grid positioning spring;
- one motion limiter associated to the at least one spring and formed in the peripheral band adjacent to the at least one spring and protruding outwardly;
- an assembly of interlaced strips comprising intersecting sets of peripheral strips and intermediate strips distributed between the peripheral strips.

The a nuclear fuel assembly is also provided comprising a bundle of fuel rods, a fuel channel and at least one spacer grid as defined above for laterally positioning the bundle of fuel rods within the fuel channel.

BRIEF SUMMARY OF THE INVENTION

The invention and its advantages will be better understood on reading the following description given solely by way of example and with reference to the appended drawings, in which.

DETAILED DESCRIPTION

Figure 1:
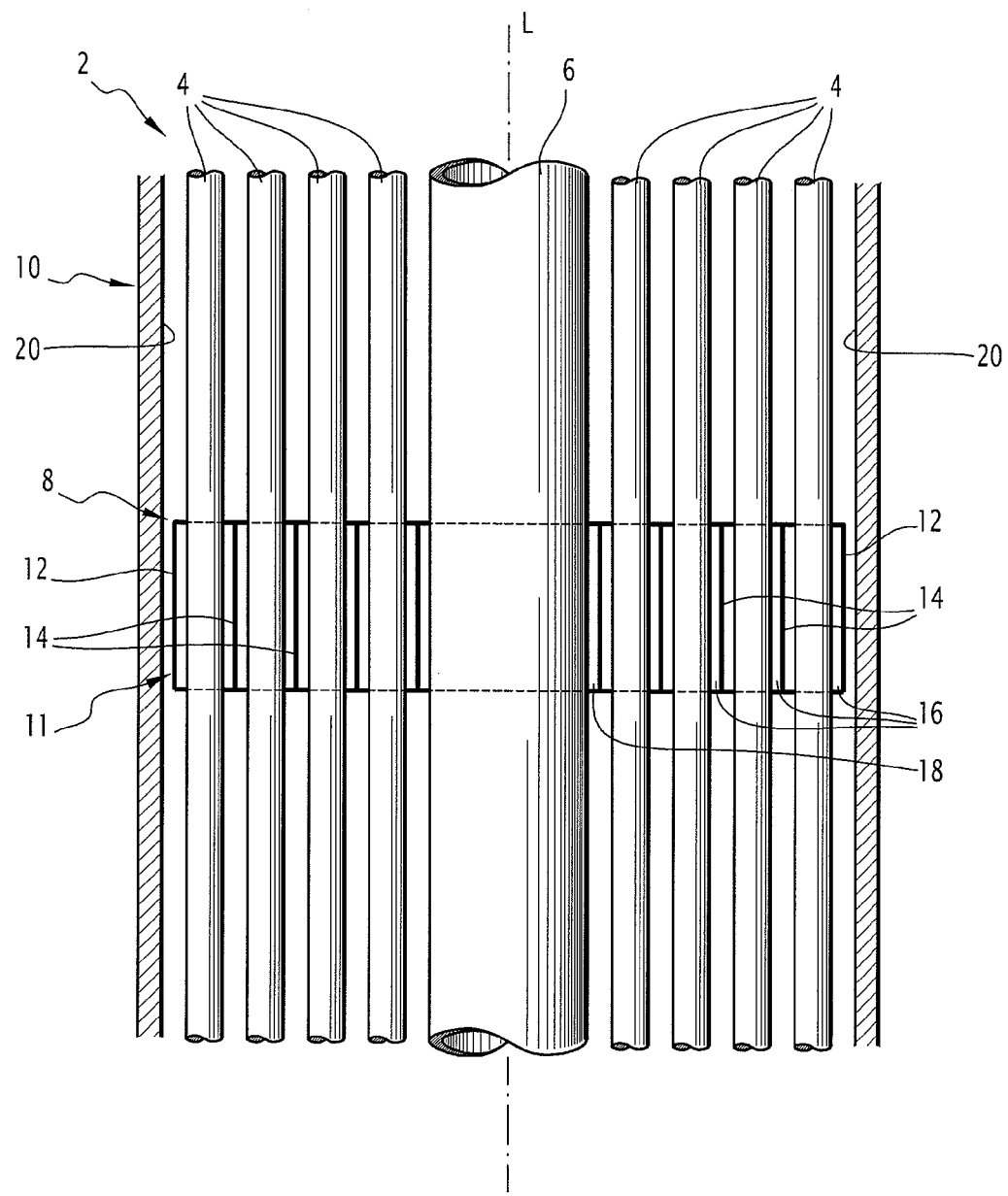
FIG. 1 is a partial sectional side view of a BWR nuclear fuel assembly.

The nuclear fuel assembly 2 for boiling water reactor illustrated on FIG. 1 is elongated along an assembly axis L extending vertically when the fuel assembly is disposed inside a nuclear reactor.

The fuel assembly 2 comprises a bundle of nuclear fuel rods 4, a tubular water channel 6 arranged within the bundle of fuel rods 4, spacer grids 8 distributed along the bundle of fuel rods 4 and maintaining the fuel rods laterally, and a tubular fuel channel 10 surrounding the bundle of fuel rods 4.

The fuel rods 4 are elongated and extend parallel to each other along the assembly axis L. Each fuel rod 4 comprises a tubular cladding, pellets of nuclear fuel stacked inside the cladding and caps closing the ends of the cladding. The fuel rods 4 are arranged in a lattice with a interspacing between the fuel rods 4.

The water channel 6 extends parallel to the fuel rods 4. The water channel 6 is arranged for channeling a coolant/moderator flow separately from interspaces between the fuel rods 4. The water channel 6 typically replaces one or several fuel rods 4 in the lattice.

The spacer grids 8 are distributed in space relationship along the fuel rods 4. Each spacer grid 8 extends transversally to the assembly axis L. Each spacer grid 8 defines a lattice of cells 16 each for generally receiving a fuel rod 4 and an opening 18 for receiving the water channel 6. The fuel rods 4 are maintained laterally by each of the spacer grids 8. The water channel 6 passes through the corresponding opening 18 of the spacer grids 8. Each spacer grid 8 is secured to the water channel 6.

The fuel channel 10 extends parallel to the fuel rods 4. The fuel channel 10 encases the bundle of fuel rods 4 and the water channel 6. The fuel channel 10 is arranged for channeling a coolant/moderator flow between and about the fuel rods 4.

The fuel assembly 2 typically comprises a lower nozzle and an upper nozzle spaced along assembly axis L, the fuel rods 4, the water channel 6 and the fuel channel 10 extending between the lower nozzle and the upper nozzle, with the water channel 6 and the fuel channel 10 connecting the lower nozzle and the upper nozzle.

In operation, the fuel assembly 2 is placed in a nuclear reactor with the assembly axis L being substantially vertical and the lower nozzle partly inserted into a coolant/moderator outlet provided in a bottom plate of the reactor. A coolant/moderator flow exiting the outlet flows into the lower nozzle and splits into a first coolant/moderator flow flowing in the water channel 6 separately from the fuel rods 4 and a second coolant/moderator flow flowing in the fuel channel 10 between and around the fuel rods 4.

The spacer grids 8 may be similar. One spacer grid 8 according to the invention will be further described in reference to FIGS. 2-4.

Figure 2:
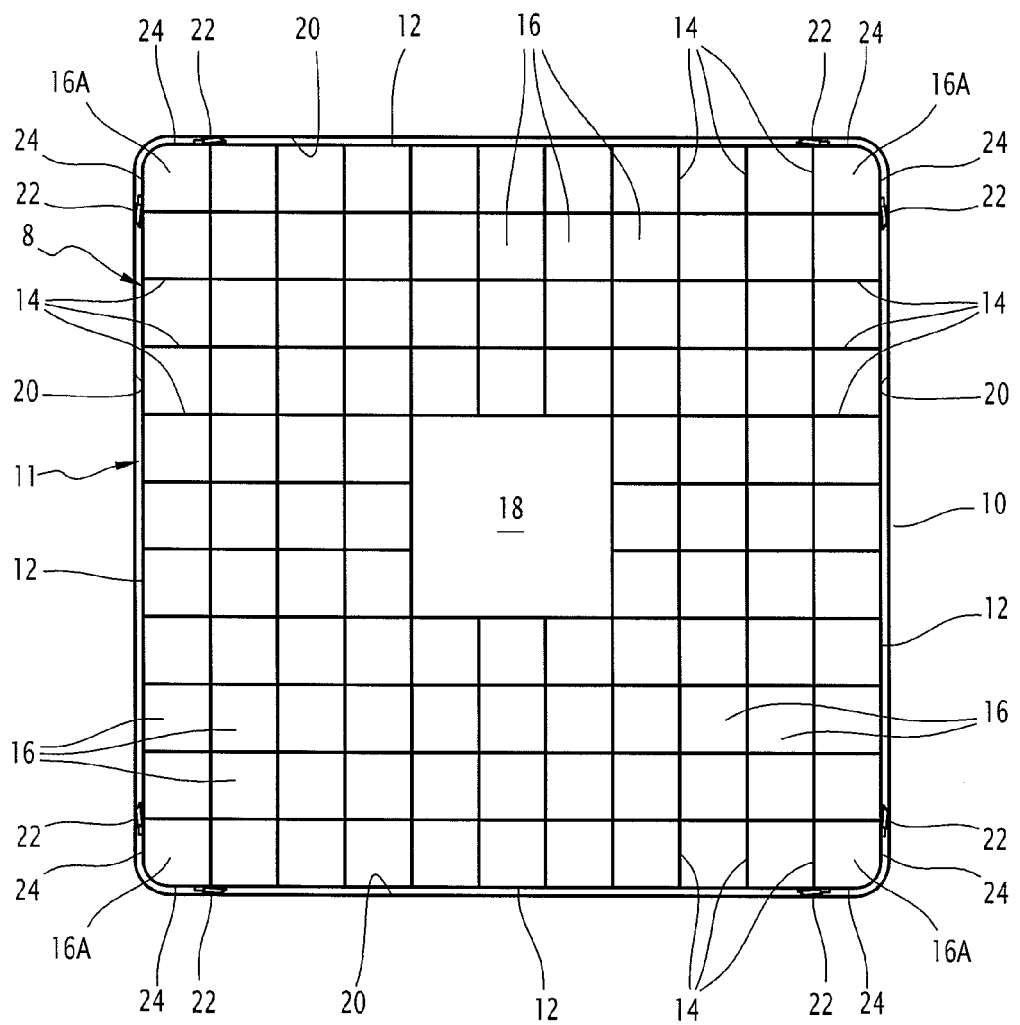
FIG. 2 is a top view of a spacer grid received in a fuel channel of the nuclear fuel assembly of FIG. 1, according to an embodiment of the invention.

FIG. 2 illustrates the spacer grid 8 received in the fuel channel 10, without the fuel rods and the water channel for the sake of clarity.

As illustrated on FIG. 2, the spacer grid 8 exhibits a square peripheral contour. The spacer grid 8 comprises fours sides joined by pairs at four corners. Alternatively, the spacer grid 8 may exhibit another shape. It may namely exhibit a polygonal shape, for instance a hexagonal contour with six sides joined by pairs at six corners.

The spacer grid 8 comprises a peripheral band 11 delimiting the peripheral contour of the spacer grid 8. The peripheral band 11 is composed of elongated peripheral strips 12 each defining one respective side of the peripheral band 11.

The spacer grid 8 comprises interlaced intermediate strips 14 extending between two opposed peripheral strips 12 and defining a lattice of cells 16, 16A each for generally receiving one respective fuel rod 4 and at least one opening 18 for receiving the water channel 6. The intermediate strips 14 comprise a first set of parallel strips extending in a first direction and a second set of parallel strips extending in a second direction different from the first direction and intersecting the strips of the first set. Peripheral cells 16, 16A are delimited outwardly by the peripheral strips 12. The spacer grid 8 comprises corner cells 16A located at the corners of the spacer grid 8 and each delimited by the end portions 24 of two adjacent peripheral strips 12.

The fuel channel 10 exhibits a transverse section corresponding to peripheral contour of the spacer grid 8. The fuel channel 10 comprises inner walls 20.

The spacer grid 8 is received within the fuel channel 10 with a transverse spacing between each side of the peripheral band 11 and a facing inner wall 20 of the fuel channel 10.

The spacer grid 8 comprises positioning means for maintaining spacing between the peripheral band 11 and the inner walls 20 of the fuel channel 10.

The positioning means comprise elastically deformable springs 22 provided on the peripheral band 11 for biasing the peripheral band 11 away from inner walls 20 of the fuel channel 10. Each spring 22 protrudes outwardly from the outer face 40 of the peripheral band 11.

Each peripheral strip 12 is provided with one spring 22 on each longitudinal end portion 24 of the peripheral strip 12.

Figure 3:
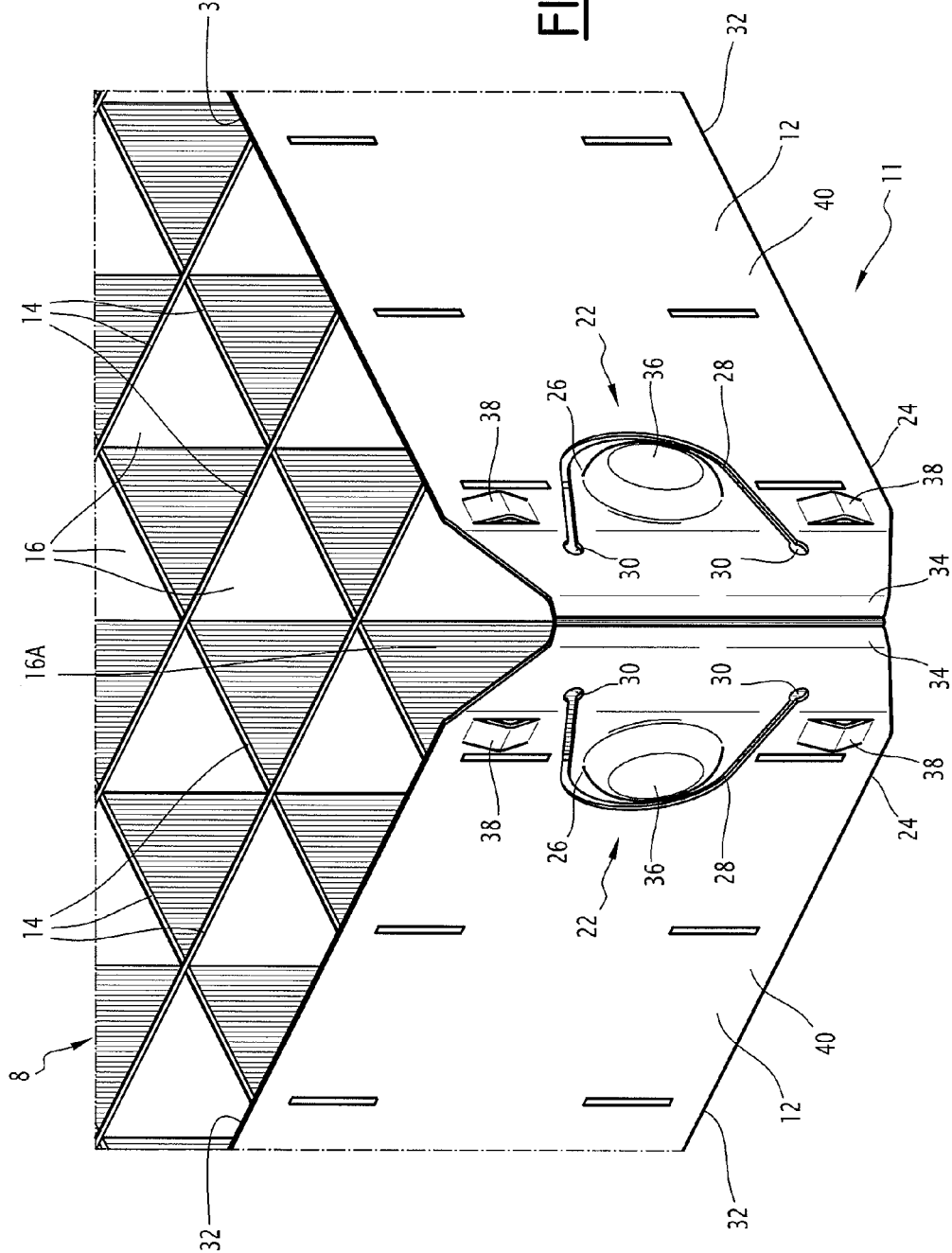
FIG. 3 is a perspective view of a corner of the spacer grid of FIG. 2.

As illustrated on FIG. 3, two springs 22 are provided adjacent to a corner of the peripheral contour of the spacer grid 8, one on each of the two adjacent peripheral strips 12 defining the corner.

Figure 4:
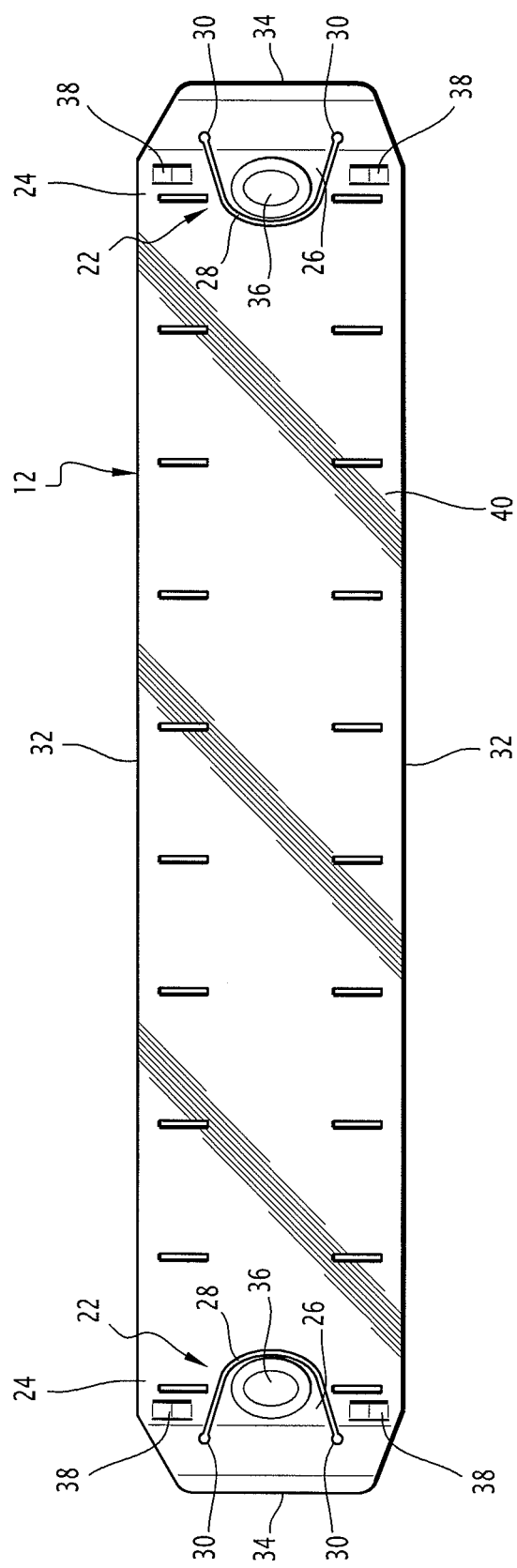
FIG. 4 is a side elevation view of a peripheral strip of the spacer grid of FIGS. 2 and 3.

As illustrated on FIGS. 3 and 4, each spring 22 is stamped in the corresponding peripheral strip 12. More specifically, each spring 22 comprises an elastically flexible cantilevered tab 26 stamped in the peripheral strip 12. The tab 26 is delimited in the peripheral strip 12 by an elongated curved slot 28. The tab 26 is delimited by the slot 28 and an imaginary line joining the opposed ends 30 of the slot 28.

As illustrated on FIGS. 3 and 4, the imaginary line extends substantially transversally to the longitudinal edges 32 of the peripheral strip 12 of the peripheral band 11. Each spring 22 extends in cantilever fashion away from the adjacent extremity 34 of the corresponding peripheral strip 12 and thus away from the edge of the adjacent corner. Each spring 22 is provided in the peripheral band 11, between the longitudinal edges 32 of the peripheral band 11.

Optionally or alternatively, at least one spring 22 or each spring 22 extends in cantilever fashion towards the adjacent extremity 34 of the corresponding peripheral strip 12 and thus towards the edge of the adjacent corner.

Optionally or alternatively, the imaginary line of at least one spring 22 or the imaginary line of each spring 22 extends substantially parallel to the two longitudinal edges 32 of the peripheral strip 12, the at least one spring 22 or each spring 22 extends in cantilever fashion towards one longitudinal edge 32 of the peripheral strip 12.

The slot 28 is curved such that it exhibits a generally U-shape with two diverging branches (or V-shape with a rounded tip). The tab 26 converges from its base towards its free tip.

In a free state of the spring 22, the tab 26 protrudes from the outer face 40 of the peripheral strip 12 oriented outwardly with respect to the spacer grid 8.

The spring 22 comprises a rigid contact projection 36 provided at the free tip of the tab 26. The contact projection 36 protrudes outwardly from the tab 26 to contact the facing inner wall 20 of the fuel channel 10. The contact projection 36 is provided for instance as a dimple stamped in the tab 26.

Each peripheral strip 12 comprises at least one rigid stop or motion limiter 38 formed in the peripheral strip 12 for limiting motion of the peripheral strip 12 towards the facing inner wall 20 of the fuel channel 10 and a subsequent overstress of the associated spring 22.

Each motion limiter 38 is provided for instance as a rigid dimple stamped in the peripheral strip 12 and protruding outwardly on the outer face 40 of the peripheral strip 12.

As illustrated on FIGS. 3 and 4, two motion limiters 38 are provided on two opposite sides of the spring 22. More specifically, one motion limiter 38 is provided above the spring 22 and the other motion limiter 38 is below the spring 22 such that the motions limiters 38 are vertically aligned with spring 22. Alternatively, the two motion limiters 38 are provided one in front of the spring 22 adjacent the free end of the spring 22 and the other behind the spring 22 adjacent the hinged end of the spring 22. Alternatively, only one motion limiter 38 is provided above the spring 22, below the spring 22, in front of the spring 22 adjacent the free end of the spring 22 or behind the spring 22 adjacent the hinged end of the spring 22. Alternatively more than two motion limiters may be provided.

Each motion limiter 38 exhibits a protruding height inferior to the protruding height of the associated spring 22 in the free state of the spring 22.

The peripheral band 11 comprising elastically deformable springs 22 allows elastic positioning of the spacer grid 8 in the fuel channel 10 with an appropriate adjustable force to ensure appropriate spacing and good performances. Motion limiters 38 avoid overstress of the springs 22 and provide minimal spacing.

As illustrated on FIGS. 3 and 4, the peripheral strip 12 comprises two identical springs 22, one at each end portion 24 of the peripheral strip 12. Alternatively, one peripheral strip 12 may comprise two different springs 22 exhibiting different shapes, heights and/or spring rates, e.g. for obtaining a specific positioning of the spacer grid 8 relative to the fuel channel 10, namely an off-centered positioning.

Similarly, the peripheral strips 12 of a spacer grid 8 may comprise identical springs 22 or alternatively different springs 22 exhibiting shapes, heights and/or spring rates, e.g. for obtaining a specific positioning of the spacer grid 8 relative to the fuel channel 10, namely an off-centered positioning.

The spring 22 integrally formed in one-piece in a peripheral strip 12 results in a simplified design of the spacer grid 8 and a reduced number of fabrication steps and reduced flow resistance, namely as compared to springs assembled to the peripheral band 11.

In the embodiments of FIGS. 2-4, springs 22 are provided at the two end portions 24 of each peripheral strip 12 whereby two springs 22 are provided close to each corner of the spacer grid 8 on the two corresponding sides.

Alternatively, a peripheral strip 12 may be provided with one spring 22 on one end portion 24 of the peripheral strip 12. The spacer grid 8 might thus be provided with springs 22 adjacent only to every other corners of the spacer grid 8, e.g. springs 22 adjacent to two diagonally opposed corners.

Alternatively, at least one of the peripheral strips 12 of a spacer grid 8 may comprise more than two springs 22 for instance spaced along the peripheral band 11 transversally to the assembly axis L.

In the embodiment of FIGS. 2-4, the peripheral band 11 is composed of several initially separate peripheral strips 12 assembled in pairs at their longitudinal end, e.g. by welding. The peripheral band 11 delimits a continuous closed contour.

Each pair of adjacent mutually assembled end portions 24 delimits together with two intersecting intermediate strips 14 a corner cell 16A of closed contour adapted for transversely maintaining a fuel rod 4 received in the corner cell 16A. Each corner cell 16A is located at a corner of the spacer grid 8.

In an alternative embodiment, the peripheral strips 12 are made in one-piece and are portions of a same single piece of metal bent and assembled at its longitudinal ends to define the peripheral band 11.

Figure 5:
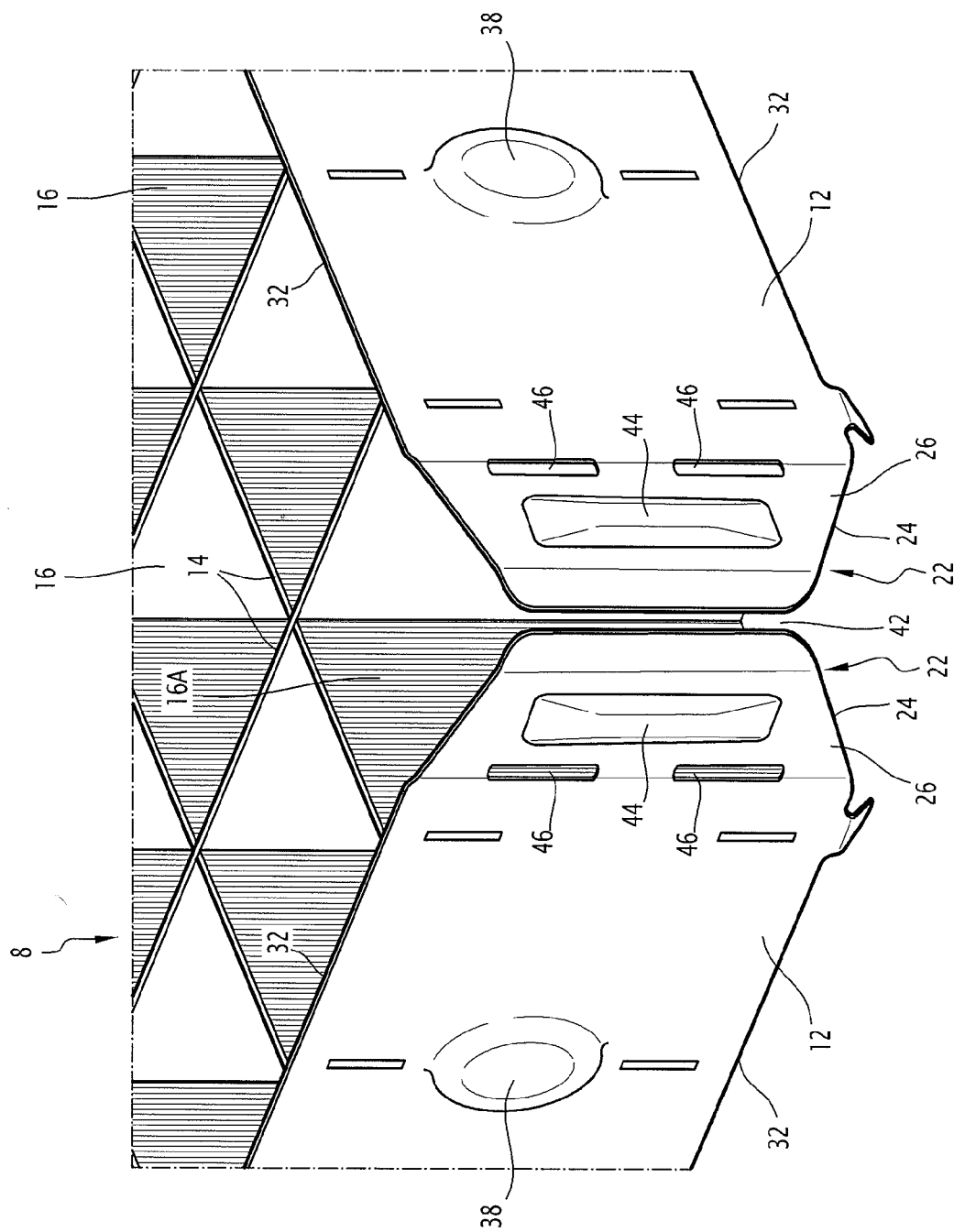
FIG. 5 is a perspective view of a corner of a spacer grid according to another embodiment of the invention.

In the alternative embodiment of FIG. 5 illustrating a corner of a spacer grid 8 in perspective view, the peripheral band 11 is cut at a corner of the spacer grid 8 in such a manner that the two adjacent end portions 24 of adjacent peripheral strips 12 end at a distance from each other and are separated by an aperture 42. The cut peripheral band 11 is discontinuous. This alternative embodiment may be implemented with the spring 22 as described above.

Alternatively, as illustrated on FIG. 5, each end portion 24 is free and forms a cantilevered positioning spring 22 protruding outwardly relative to the spacer grid 8 for contacting a facing wall adjacent the periphery of the spacer grid 8, namely a facing inner wall 20 of the fuel channel 10.

The end portions 24 thus delimit together with two intersecting intermediate strips 14 a corner cell 16A laterally opened.

Each end portion 24 defines an elastically flexible cantilevered tab 26 extending in cantilever from a connection of the peripheral strip 12 with an intermediate strip 14.

Each end portion 24 is configured to contact the facing inner wall 20 of the fuel channel 10 while being elastically deformable for elastically positioning the spacer grid 8. The end portions 24 are independently elastically flexible.

Separate end portions 24 of the peripheral strip 12 allow elastic positioning of the spacer grid 8 while allowing to obtain the spacer grid 8 with a reduced number of parts and a reduced number of operation, namely without welding of the peripheral strip 12 at the corner of the spacer grid 8.

Optionally, each end portion 24 is provided with a rigid contact projection 44 protruding outwardly from the tab 26 to contact the facing inner wall 20. The contact projection 44 is provided e.g. as a rigid dimple stamped in the end portion 24. By varying the height and length of the dimple, the positioning performances of the spacer grid 8 may be optimized.

Optionally, each end portion 24 is provided with at least one slot 46 to adjust the spring force of the tab 26.

Optionally, each peripheral strip 12 is provided with at least one motion limiter 38 located adjacent to the free end portion 24 for avoiding overstress. The motion limiter 38 is preferably formed in a fixed portion of the peripheral strip 12 out of the cantilevered end portion 24. As illustrated on FIG. 5, the motion limiter 38 is formed in a fixed portion of the peripheral strip 12 opposite the end portion 24 relative to a connection with an intermediate strip 14.

In one embodiment, the peripheral band 11 is cut at each corner and each peripheral strip 12 has its two end portions 24 configured as springs 22. Springs 22 are provided at each corner of the spacer grid 8.

In an alternative embodiment, peripheral strip end portions 24 configured as springs 22 are provided only at a limited number of the corners of the spacer grid 8 inferior to the total number of corners of the spacer grid 8, e.g. at two diagonally opposed corners of the spacer grid 8. In such an embodiment, one peripheral strip 12 may have one end portion 24 configured as a spring 22 and the other opposite end portion 24 assembled to that of another peripheral strip 12 and optionally provided with spring 22, projection 36 and motion limiter 38 according to the first embodiment of the invention.

The bundle of fuel rods 4 may comprise full-length fuel rods 4 and part-length fuel rods 4 of shorter length than the full-length fuel rods. A spacer grid 8 provided with a peripheral band 11 cut at a corner is especially adapted when the bundle of fuel rods 4 comprises a part-length fuel rod at said corner.

As illustrated on FIG. 2, the spacer grid 8 exhibits a square peripheral contour and defines a 11×11 square lattice of cells 16 with the opening 18 replacing a 3×3 array of cells 16. Other arrangements may be contemplated by varying the number of cells 16 in the lattice (e.g. 9×9, 10×10 12×12), the peripheral contour of the spacer grid 8 and corresponding lattice (for instance square shaped, rectangular shaped or hexagonal shaped). Similarly, the number, shape and size of the water channel 6 may vary. Hence, the number of openings 18 for receiving water channel(s) or water rods (one opening 18, two openings 18 or more) and the size and shape of the openings 18 for receiving water channels or water rods (1×1, 1×2, 2×1, 2×2, 2×3, 3×3 . . . ) may vary correspondingly.

The invention applies in particular to fuel assemblies comprising a fuel channel, where it is preferable to maintain an adequate spacing between the bundle of fuel rods and the inner walls of the fuel channel to allow adequate flow of coolant/moderator in the fuel channel between and around the fuel rods, i.e. namely to BWR or VVER fuel assemblies.

What is claimed is:

1. A nuclear fuel assembly spacer grid defining cells for receiving fuel rods, the spacer grid comprising:
    a peripheral band composed of at least one peripheral strip delimiting a portion of the peripheral contour of the spacer grid, and at least one spacer grid positioning spring elastically deformable and formed in the peripheral band; and
    interlaced intermediate strips distributed within the peripheral contour,
    the at least one spacer grid positioning spring protruding outwardly relative to the at least one peripheral strip,
    the at least one spacer grid positioning spring being cantilevered by extending in a cantilever fashion horizontally away from or towards a corner of the spacer grid,
    the at least one spacer grid positioning spring including a flexible cantilever tab and a contact portion protruding outwardly from the flexible cantilever tab,
    the at least one spacer grid positioning spring being located vertically between an upper plane and a lower plane of the spacer grid, the upper plane being defined respectively by upper edges of the interlaced intermediate strips, the lower plane being defined by lower edges of the interlaced intermediate strips of the spacer grid.

2. The spacer grid according to claim 1, wherein the at least one spacer grid positioning spring is stamped in the peripheral band.

3. The spacer grid according to claim 1, wherein the at least one spacer grid positioning spring is delimited in the peripheral band by at least one elongated slot cut in the peripheral band.

4. The spacer grid according to claim 3, wherein the at least one elongated slot is a curved slot.

5. The spacer grid according to claim 1, wherein the contact portion is rigid.

6. The spacer grid according to claim 1, wherein the at least one spacer grid positioning spring is at a longitudinal end portion of one of the at least one peripheral strip.

7. The spacer grid according to claim 6, wherein the at least one spacer grid positioning spring includes two spacer grid positioning springs formed in one of the at least one peripheral strip each at a respective longitudinal end portion of the peripheral strip.

8. The spacer grid according to claim 1, wherein the peripheral band is composed of several peripheral strips each delimiting a side of the peripheral contour of the spacer grid, the at least one spacer grid positioning spring including a plurality of spacer grid positioning springs, each peripheral strip comprising two of the spacer grid positioning springs each at a respective longitudinal end portion of the corresponding peripheral strip.

9. The spacer grid according to claim 1, wherein the at least one spacer grid positioning spring is formed by at least one free cantilevered end portion of the peripheral band.

10. The spacer grid according to claim 9 further comprising at least one corner cell delimited by two peripheral strip free end portions of two peripheral strips of the peripheral band delimiting two adjacent sides of the peripheral contour of the spacer grid, said free end portions being separated from each other by an aperture such that the at least one corner cell is laterally opened.

11. The spacer grid according to claim 10, wherein each corner cell is delimited by two free end portions of two adjacent peripheral strips separated by an aperture.

12. The spacer grid according to claim 10, wherein the at least one spacer grid positioning spring includes at least two spacer grid positioning springs, each of the two free end portions delimiting the at least one laterally opened corner cell includes therein a respective one of the at least two spacer grid positioning springs.

13. The spacer grid according to claim 1 further comprising at least one motion limiter configured for limiting motion of the at least one peripheral strip and avoiding overstress of the at least one spacer grid positioning spring and formed in the peripheral band vertically aligned with the at least one spacer grid positioning spring and protruding outwardly.

14. The spacer grid according to claim 9 wherein the at least one peripheral strip includes a plurality of peripheral strips, the intermediate strips distributed between the peripheral strips forming an assembly of interlaced strips.

15. A nuclear fuel assembly comprising:
    a bundle of fuel rods,
    a fuel channel and
    at least one spacer grid according to claim 1, for laterally positioning the bundle of fuel rods within the fuel channel.

* * * * *